Figure 1:
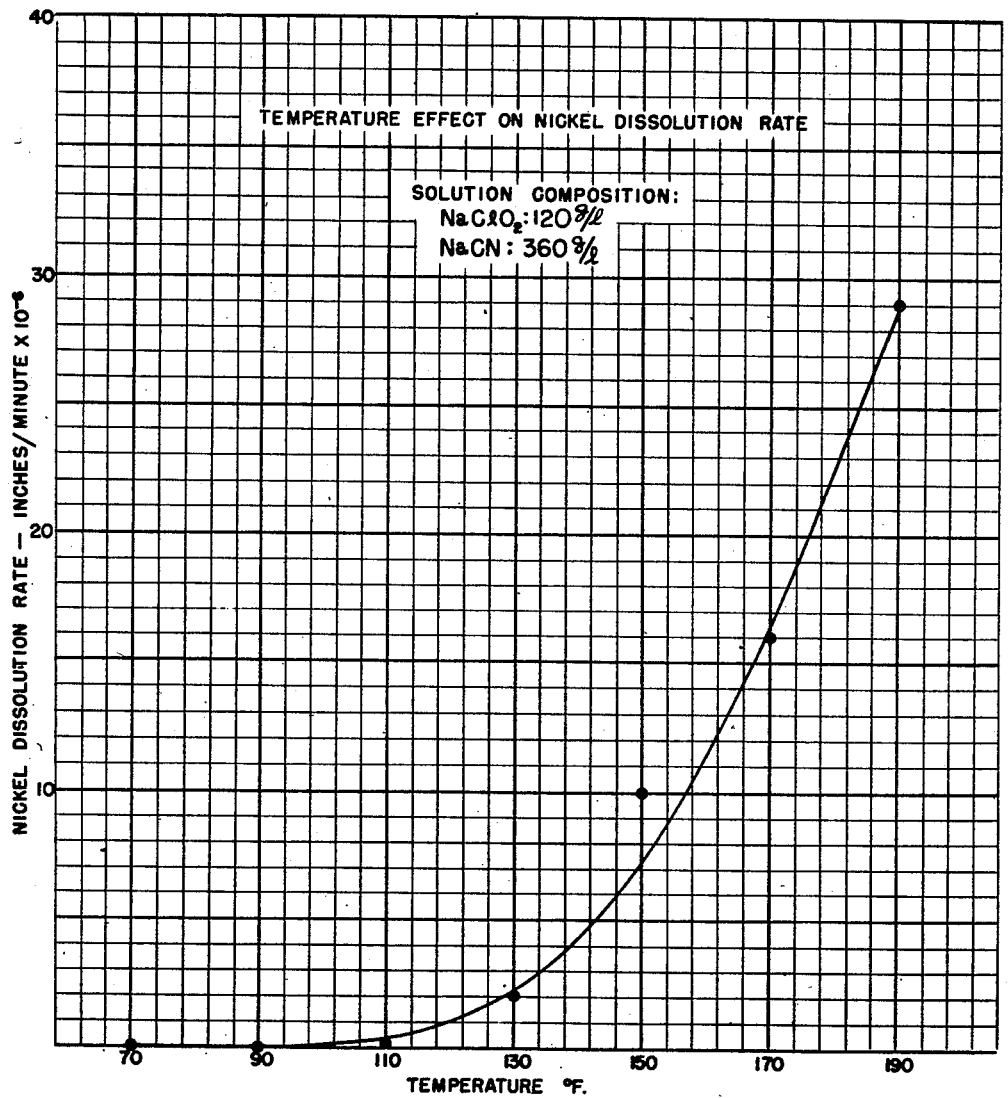

July 17, 1951     W. R. MEYER     2,561,065
COMPOSITION FOR AND PROCESS OF
REMOVING METALLIC COATINGS Filed April 15, 1949     3 Sheets-Sheet 1

INVENTOR.
WALTER R. MEYER
BY
Pennie, Edmonds, Morton & Barrows
ATTORNEYS

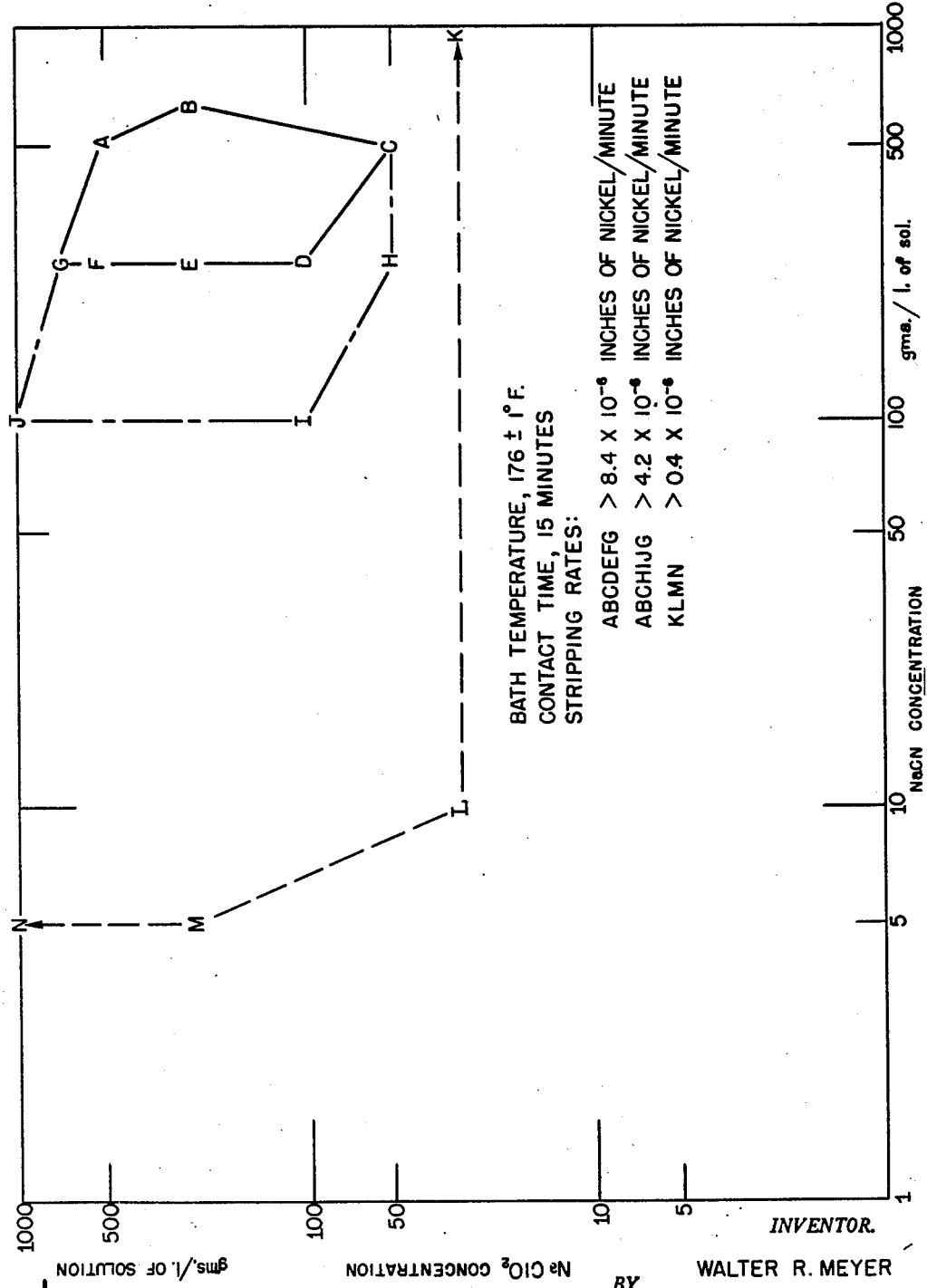

Patented July 17, 1951

2,561,065

UNITED STATES PATENT OFFICE 2,561,065

COMPOSITION FOR AND PROCESS OF REMOVING METALLIC COATINGS

Walter R. Meyer, Hamden, Conn., assignor to Enthone, Inc., New Haven, Conn., a corporation of Connecticut Application April 15, 1949, Serial No. 87,637

5 Claims. (Cl. 75—97)

The present invention relates to the stripping, or selectively dissolving, of certain metals from dissimilar metal surfaces and provides an improved stripping method and stripping bath whereby the metal coatings may be selectively removed without injuring the undersurface as by etching, pitting, or the like.

The invention is especially adaptable to the stripping of nickel from steel surfaces and will be particularly described and illustrated with reference thereto. However, it is also useful in stripping copper, zinc, silver, or cadmium coatings from steel surfaces and may be used, with advantage, in stripping nickel, copper, zinc, silver, or cadmium, from iron, or chromium surfaces.

Nickel, for instance, is frequently plated on steel surfaces and often due to faulty plating, or excessive wear, it is desired to remove the plating so that a new coating of nickel, or other metals may be applied. For a satisfactory replating job, it is required that the old coating be completely removed without pitting or etching, or otherwise injuring the undersurface. If this can be satisfactorily accomplished, the expense of repolishing the undersurface prior to replating may be avoided.

This requirement is satisfactorily met by the present invention whether the coating metal to be stripped has been applied by electroplating, rolling, dipping, or other known procedure for applying metal coatings of the specified metals.

The stripping bath of my present invention may be prepared by dissolving in water sodium chlorite and sodium cyanide in proportions within the ranges hereinafter indicated. Instead of these sodium salts, corresponding compounds of potassium may be used. However, sodium compounds are generally preferred because of their lower cost. For convenient and safe handling, the chlorite may be used in admixture with hydroxide, i. e., sodium or potassium hydroxide. Here, too, sodium hydroxide is usually preferred because it is less expensive, but otherwise the use of potassium hydroxide has been found more advantageous than sodium hydroxide. The hydroxide does not interfere with my stripping operation and is effective to stabilize the chlorite.

Where hydroxide is used, the chlorite and hydroxide may, with advantage, be premixed in the dry state in the desired proportions as described and claimed in my United States Patent No. 2,460,896, but the cyanide should not be premixed with either of the other constituents in the dry state as the mixture is unstable. In preparing the stripping solution, the cyanide should be separately weighed out and separately added to the solution. Clean steel equipment should be used for handling the materials especially the chlorite or chlorite-hydroxide mixture.

Generally satisfactory stripping solutions may be prepared by dissolving these three constituents in water in the following proportions:

|  | Pounds |
|---|---|
| Hydroxide | 1 |
| Chlorite | 1 |
| Cyanide | 3 | per gallon of the resulting solution.

These proportions are, however, subject to some variation depending upon operating conditions, including temperature of the bath and the time of exposure of the metal objects to the bath, as well as the particular coating to be stripped. The hydroxide is not an essential constituent of the bath, its primary purpose being to stabilize the chlorite in shipment and storage. Therefore in the following illustrations, hydroxide has been omitted.

The proportion of chlorite in the bath may be as low as five grams per liter and the proportion of cyanide as low as one gram per liter. On the other hand, the proportion of each may be increased to the limit of solubility in the solution, that is, to saturation with respect to the respective constituents. The solubility of the respective constituents will, of course, be influenced by whether or not the hydroxide is added with the chlorite and also will vary with the temperature of the solution. For example, proportions of sodium cyanide and sodium chlorite in terms of gram per liter of solution which have satisfactorily been concurrently dissolved in aqueous solution at 176° F. are set forth in the following table:

Table

|  | A | B | C | D |
|---|---|---|---|---|
| Sodium cyanide | 250 | 100 | 500 | 600 |
| Sodium chlorite | 750 | 1,000 | 500 | 250 |

The maximum proportions which may be used in any particular instance will, of course, vary with operating temperature of the bath. In most instances, bath temperatures should be within the range of 130°–210° F., but, in the stripping of copper, the temperature may satisfactorily be as low as 70° F., even with low bath concentration.

Excessive temperatures should be avoided so as not to cause excessive decomposition of the chlorite and cyanide. It has been found that the chlorite in the stripping solution is reasonably stable at temperatures as high as 150°–210° F. At a temperature of 150° F., the sodium cyanide appears to react with the nickel, for instance, to give off hydrogen and at about this same temperature the chlorite is activated so as to assist in the dissolving reaction. Consequently, temperatures of 150°–210° F. are particularly advantageous in the stripping of nickel from steel.

The stripping solution should be prepared and used in a steel tank and, where equipped with a heating coil, the coil too should be of steel. Stainless steel may be used with advantage for these purposes. Steel, or stainless steel hooks, or trays for holding the metal objects in the solution are advantageous.

In my improved stripping operation, the temperature and concentration are, to a considerable extent, interdependent. For a given concentration and given proportions, the dissolving rate, i. e., the rate of selectively dissolving the coating metal, nickel, for instance, from the metal object has been found generally to increase with temperature. This relationship is well illustrated by the accompanying curve constituting Figure 1 of the drawings, in which the dissolving rate of the nickel, expressed in inches of nickel per minute $\times 10^{-6}$, is plotted against stripping bath temperature expressed in degrees Fahrenheit. In each instance, the stripping bath contained 120 grams per liter of sodium chlorite and 360 grams per liter of sodium cyanide.

Figure 2:
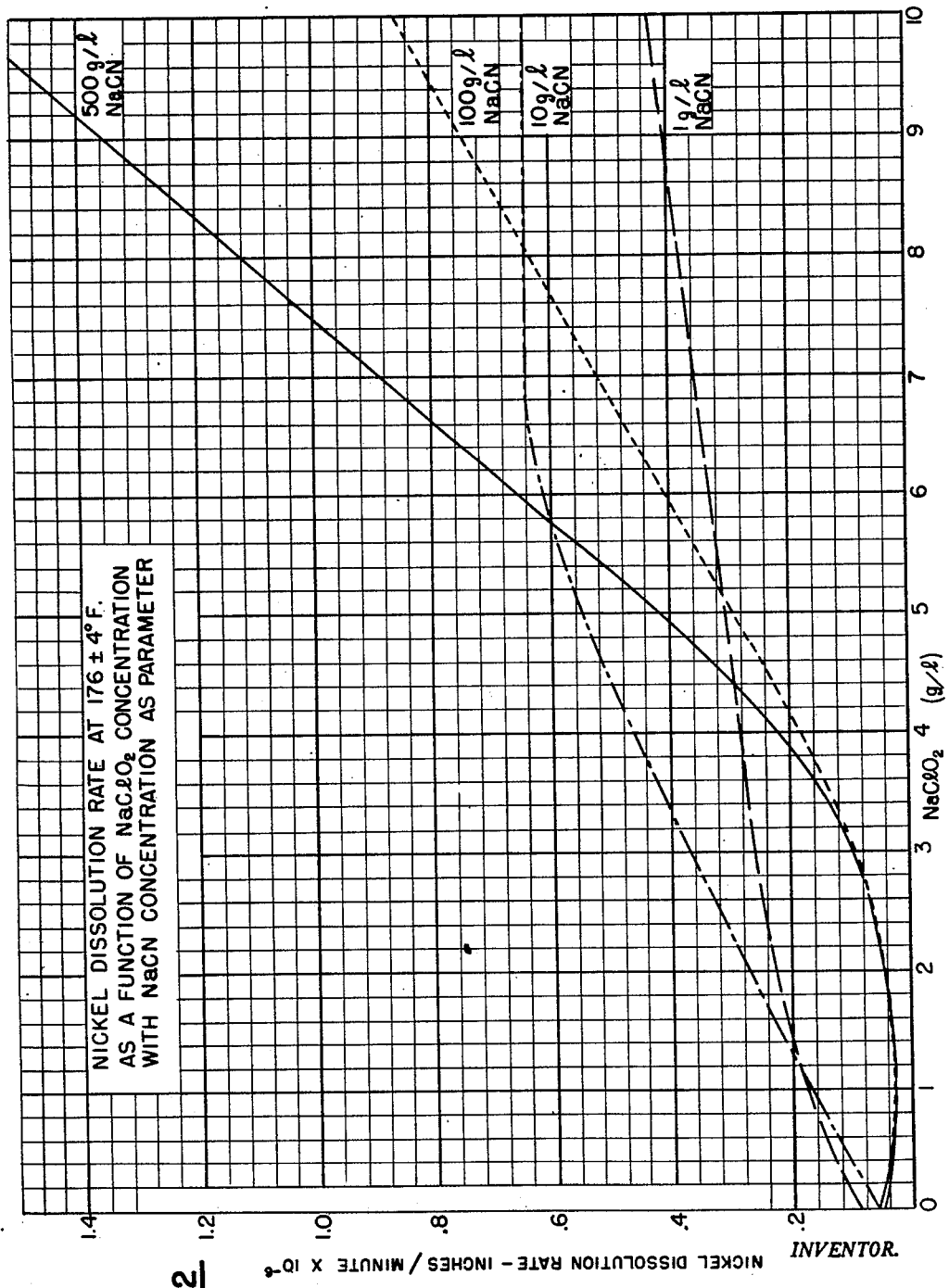

The stripping rate at a constant temperature has been found to increase, generally with an increase in the proportion of chlorite used, the proportion of sodium cyanide being held constant, as is illustrated by the curves constituting Figure 2 of the drawings. In each instance, the temperature was maintained at 176°±4° F. Each of the four curves represents a different concentration of sodium cyanide, as indicated. The stripping rate also, in terms of inches of nickel per minute $\times 10^{-6}$, has been found to increase at different rates as the chlorite concentration is increased depending upon the concentration of sodium cyanide in the solution. For instance, with only one gram per liter of sodium cyanide, the stripping rate increases only moderately with an increase in sodium chlorite concentration from zero to 10 grams per liter. In a solution containing 10 grams per liter of sodium cyanide, the stripping rate increases markedly with an increase in sodium chlorite up to a concentration of about 6 grams per liter of sodium chlorite and the curve then levels off. But, in solutions containing 100 grams per liter and 500 grams per liter, respectively, of sodium cyanide, the stripping rate increases little as the sodium chlorite concentration is increased from zero to about 3 grams per liter. But, on increasing the sodium chlorite concentration above 3 grams per liter, the stripping rate was found to increase rapidly, the slope of curve again depending on the proportion of sodium cyanide in the solution.

It will be understood that the shape of these curves will vary somewhat with temperature conditions. The general trend is, however, illustrated by the curves of Figure 2.

The relationship between desirable concentration of the chlorite and of the cyanide and the effectiveness of the resultant solutions are illustrated by the areas shown on Figure 3 of the drawings which represents results obtained expressed in terms of inches of nickel stripped per minute from a steel surface by submerging the metal for 15 minutes in an aqueous bath at a temperature of 176°±1° F. without agitation, the concentration of sodium chlorite and sodium cyanide, respectively, being varied from 1 to 1,000 grams per liter of solution.

Where the respective concentrations were within the range represented by the area ABCDEFG, the stripping rate was found to be in excess of $8.4 \times 10^{-6}$ inches of nickel per minute. With concentrations of the respective materials within the range represented by the area ABCHIJG, the stripping rate was greater than $4.2 \times 10^{-6}$ inches of nickel per minute and within the ranges represented by the area KLMN the stripping rate was in excess of $0.4 \times 10^{-6}$ inches of nickel per minute.

It appears, therefore, that in stripping nickel at the indicated temperature, it is advantageous to stay within the area ABCDEFG or at least within the area ABCHIJG. As previously indicated, the process is effective, even under conditions without the area KLMN, but for rapid stripping under the indicated conditions, it is desirable to operate in that area. As appears from the chart, it is advantageous that the chlorite concentration be not less than 50 grams per liter of solution and that the cyanide concentration be not less than 100 grams per liter of solution. The upper limit of these constituents is their solubility in the solution.

Under different temperature conditions, the extent of the respective areas of Figure 3 will vary somewhat. At lower temperatures, the pattern of the curves is about the same, but the stripping rate is somewhat lower. As the temperature of the bath is increased above 176° F. these areas of Figure 3 have been found to widen. Temperatures below 80° F. are normally less desirable because of the decreased solubility of the reagents at the lower temperatures. However, as previously indicated in the stripping of copper, temperatures as low as 70° F. may be employed. The copper strips readily and relatively low concentrations of the reagents may, with advantage, be employed.

In all of the tests herein illustrated, the coating metal was cleanly stripped without injury to the surface of the undersurface. It will be understood that these results were attained without the aid of electric current through the solution. The parts to be stripped are merely hung in the solution and the metal coating is selectively dissolved chemically.

If the metal parts to be stripped are greasy or oily, they should be cleaned to "no waterbreak" before being placed in the stripping solution as by means of an alkali cleaner so that the stripping solution may uniformly wet the surface of the metal parts.

Sometimes in dissolving unusually heavy nickel plate, for instance, over .001 inch thickness, it may be necessary to remove the metal part from the solution before the stripping is completed, rinse off any residue remaining on its surface, then reimmerse the part in the stripping solution. It has been found that, with very heavy nickel plating, the stripping action may diminish and this rinsing just noted serves to accelerate the stripping. In most cases, however, complete and clean stripping may be accomplished in one operation without intervening rinsing.

After continued use, the metal being stripped, nickel, for instance, will build up in the solution until its salts tend to be precipitated out. The clear solution can then be decanted to separate out the precipitated salts.

After final removal from the stripping bath, the work should be rinsed thoroughly in clean, running, cool water.

I claim:

1. An aqueous solution particularly adapted to the selective dissolving of a coating of a metal of the group consisting of nickel, copper, zinc, silver and cadmium from the surface of a metal of the group consisting of iron, steel and chromium said solution consisting essentially of water, an alkali metal chlorite, and an alkali metal cyanide in proportions within the range of 5 grams chlorite and 1 gram cyanide per liter of solution, respectively, up to saturation of the respective reagents in the solution.

2. An aqueous solution particularly adapted to the selective dissolving of nickel from the surface of steel, said solution consisting essentially of water, an alkali metal chlorite, and an alkali metal cyanide in proportions and concentrations within the range represented by the area ABCDEFG of Figure 3 of the accompanying drawings.

3. An aqueous solution particularly adapted to the selective dissolving of a coating of nickel from the surface of steel, said solution consisting essentially of water, an alkali metal chlorite, and an alkali metal cyanide in proportions and concentrations within the range represented by the area ABCHIJG of Figure 3 of the accompanying drawings.

4. Process for selectively dissolving a coating of a metal of the group consisting of nickel, copper, zinc, silver, and cadmium from the surface of a metal of a group consisting of iron, steel, and chromium which comprises immersing the metal object to be stripped in an aqueous solution of the following materials in proportions within the indicated ranges:

Alkali metal chlorite, 5 grams per liter to saturation
Alkali metal cyanide, 1 gram per liter to saturation at a temperature within the range of about 70° to 210° F.

5. Process for selectively dissolving a coating of nickel from a steel surface which comprises immersing the coated surfaces in an aqueous solution of the following materials in proportions within the indicated ranges:

Alkali metal chlorite, 5 grams per liter to saturation
Alkali metal cyanide, 1 gram per liter to saturation at a temperature within the range of 130° to 210° F.

WALTER R. MEYER.

REFERENCES CITED

The following references are of record in the file of this patent:

"Metal Finishing," November 1945, page 458.
"Iron Age," May 8, 1947, page 66.
"Comprehensive Treatise on Inorganic and Theoretical Chemistry," vol. 2, published by Longmans, Green & Co., 1922, page 283.